Patented Nov. 19, 1935

2,021,763

UNITED STATES PATENT OFFICE 2,021,763

MANUFACTURE OF ARTIFICIAL PRODUCTS

Walter Bauer, Darmstadt, Germany, assignor to Röhm & Haas Company, Philadelphia, Pa.

No Drawing. Application February 24, 1933, Serial No. 658,449. In Germany February 24, 1932

15 Claims. (Cl. 260—2)

This invention relates to improvements in or relating to the manufacture of artificial products which are useful for a large variety of purposes.

It has been found that when treated with chlorine the polymers of acrylic acid and/or its derivatives and/or homologues thereof take up chlorine with the separation of hydrogen chloride.

The amount of chlorine taken up extends up to 50% and more of the original weight. As the chlorination can be interrupted at any stage products of various chlorine content can be produced. As the solubility of the chlorinated polymers depends on the chlorine content their solubility can be influenced in this manner; the polymerized esters of acrylic and methacrylic acid behave in a particularly advantageous manner. For example, a polymerized acrylic acid methyl ester dissolved in chloroform after an absorption of about 50% of chlorine and evaporation of the solvent is no longer soluble in chloroform, acetic acid ester and other solvents in which it was soluble before chlorination.

The chlorinated polymers may be used for the production of artificial materials such as lacquers, films, intermediate layers for safety glass, articles to be used in electro-technology, threads, artificial leathers, oil-cloth, artificial silk, fabrics of the most various kinds, sacks, elastic and transparent bandages, handles for knives, umbrellas, brushes and the like, buttons, buckles, billard balls, drinking cups, playing discs, gramophone records, tooth brushes, rulers, fountain pens, dentures and other dental articles, shoe soles, floor coverings and numerous other articles.

The chlorinated polymers have a greater hardness and consequently a greater power of resisting mechanical stresses than the non-chlorinated ones. As they have a higher softening point they are also more stable to elevated temperature and possess a reduced inflammability. By the absorption of chlorine which is inexpensive a material cheapening of the polymers is obtained. The chlorinated polymers can, at any desired stage of their production, be mixed with other chlorinated and/or non-chlorinated polymers and/or other organic and/or inorganic additional substances such as linseed oil, cellulose derivatives, softening agents such as phthallic acid esters, fillers such as carbon blacks, kaolin and dyestuffs.

The chlorination of the polymers is generally carried out in the solid or dissolved state, but it can also be done otherwise for example it can proceed in emulsion. If, for example, films are treated with chlorine a hardening of the films takes place together with an increase in tensile strength. When working in solutions such solvents are employed as do not react with chlorine or as do so sufficiently slowly, such for example as chlorinated hydrocarbons, chloroform, trichlorethylene, carbon tetrachloride, tetrachlorethane. The polymers need not be treated with chlorine by themselves, but mixtures of polymers can also be so treated. These mixtures again can be produced either by combination of completed polymers or by combined polymerization.

Especially suitable for chlorination are the polymerized compounds of acrylic acid and alpha-substituted acrylic acids such for example as chloracrylic acid, methacrylic acid and the like and their esters, chlorides, nitriles, amides and anhydrides.

The absorption of chlorine is materially accelerated by the known catalysts such for example as light, metals and metallic salts preferably iron, as well as by metalloids such for example as bromine, iodine, phosphorus, arsenic, sulphur and the like for itself or in mixture of these substances.

The action of the chlorine is extraordinarily vigorous and proceeds with generation of heat. It is therefore advisable to cool and stir and when operating in solution to lead the hydrogen chloride which passes off through a cooler for the purpose of retaining the solvents. The absorption of the chlorine by the polymers is so vigorous that, for example when passing chlorine into a chloroform solution of polymerized acrylic acid ester, the chlorine reacts practically only with the polymer and not with the chloroform.

After completion of the reaction the chlorine and hydrogen chloride still present in the solution can be removed either by heating and passing air through the solution or by treatment with water vapour or dilute alkali.

The reaction can be carried out otherwise than at atmospheric pressure.

I desire to state that it is already known that an aqueous solution of polymerized vinyl alcohol will take up bromine or chlorine, but the products thereby obtained are insoluble and decompose easily. The chlorination products prepared according to the present invention do not show this property of easy decomposition.

In order that the invention may be well understood I will now describe, as examples only, several methods in which it may be carried out:—

Example 1

A vigorous stream of chlorine is passed into 1000 parts by weight of a 10% solution of polymerized acrylic acid methyl ester in chloroform for a period of 15 hours in the presence of light. The chlorine is adsorbed and hydrogen chloride escapes from the solution. After treatment with water vapour 150 parts by weight of a solid white porous material which is soluble in organic solvents such as acetic acid ester, acetone and the like remains.

*Example 2*

Chlorine is passed into a solution of 50 grs. polyacrylic acid in 450 cc. water for 15 hours whereby chlorine is adsorbed with a rise in temperature to about 40° C. The solution is then heated and air passed through the same for the purpose of removing the chlorine, the water being then distilled off. There remain 62,5 grms. of a hard almost colourless substance, which contains 20% of chlorine and which is soluble in water.

*Example 3*

A film of polymerized acrylic acid methyl ester is treated for five hours with chlorine gas. Its tensile strength is thereupon increased by about 30%.

*Example 4*

100 parts by weight of a 20% solution of polymerized acrylic acid methyl ester of low viscosity, in chloroform are treated with 0,2 parts by weight of iron heated on the water bath and chlorine is passed into the solution for six hours whilst stirring. The chlorine is adsorbed and hydrogen chloride escapes. The polymerized acrylic acid methyl ester takes up about 5 parts by weight of chlorine in six hours.

*Example 5*

Chlorine is whilst stirring passed into 100 parts by weight of a 10% solution of polymerized methacrylic acid ethyl ester in chloroform for 10 hours when the polymerized methacrylic acid ester increases in weight by from 20–30%.

*Example 6*

15 parts by weight of the chlorinated polymerized acrylic acid methyl ester prepared according to Example 1 are dissolved together with 5 parts by weight of polymerized acrylic acid butyl ester in 75 parts by weight of acetic acid ester with the addition of 5 parts by weight of titanium white. A lacquer of great resistance and excellent adhesive properties is produced.

*Example 7*

1000 parts by weight of a 10% solution of polymerized acrylic acid methyl ester in chloroform are treated with 100 parts by weight of dry sodium carbonate and a vigorous stream of chlorine is led into the boiling and stirred solution for 16 hours. After the salt has been washed out with water and the chloroform driven off, the chlorinated polyacrylic acid methyl ester is obtained in the form of a white porous mass of good stability.

Having now particularly described and ascertained the nature of said invention, and in what manner the same is to be performed, I declare that what I claim is:—

1. The process of manufacturing artificial compounds which comprises treating with chlorine the polymerized product of at least one of the group consisting of acrylic acid, alpha-substituted acrylic acids and, the esters, nitriles, amids, chlorides and anhydrides of said acids.

2. The process of manufacturing artificial compounds which comprises treating with chlorine the polymerized product of at least one of the group consisting of acrylic acid, alpha-substituted acrylic acids and, the esters, nitriles, amids, chlorides, and anhydrides of said acids in the presence of a solvent.

3. The process of manufacturing artificial compounds which comprises treating with chlorine the polymerized product of at least one of the group consisting of acrylic acid, alpha-substituted acrylic acids and the esters, nitriles, amids, chlorides, and anhydrides of said acids in the presence of a catalyst.

4. The process of manufacturing artificial compounds which comprises treating with chlorine the polymerized product of at least one of the group consisting of acrylic acid, alpha-substituted acrylic acids and, the esters, nitriles, amids, chlorides, and anhydrides of said acids in a solvent in the presence of a catalyst.

5. The process of manufacturing artificial compounds which comprises treating with chlorine the polymerization product of an ester of acrylic acid.

6. The process of manufacturing artificial compounds which comprises treating with chlorine the polymerization product of an ester of methacrylic acid.

7. The process of manufacturing artificial compounds which comprises treating with chlorine the joint polymerization product of an ester of acrylic acid and an ester of methacrylic acid.

8. A composition of matter comprising a chlorinated polymer of at least one of the group consisting of acrylic acid, alpha-substituted acrylic acids and, the esters, nitriles, amids, chlorides, and anhydrides of said acids.

9. As a new composition of matter a chlorinated polymer of an ester of acrylic acid.

10. As a new composition of matter a chlorinated polymer of an ester of methacrylic acid.

11. As a new composition of matter a chlorinated joint polymer of an ester of acrylic acid and an ester of methacrylic acid.

12. A composition of matter comprising a chlorinated polymer of at least one of the group consisting of acrylic acid, alpha-substituted acrylic acids and the esters, nitriles, amids, chlorides and anhydrides of said acids and a filling material.

13. A composition of matter comprising a chlorinated polymer of at least one of the group consisting of acrylic acid, alpha-substituted acrylic acids and the esters, nitriles, amids, chlorides and anhydrides of said acids and a plasticizer.

14. A composition of matter comprising a chlorinated polymer of at least one of the group consisting of acrylic acid, alpha-substituted acrylic acids and the esters, nitriles, amids, chlorides and anhydrides of said acids and a derivative of cellulose.

15. A composition of matter comprising a chlorinated polymer of at least one of the group consisting of acrylic acid, alpha-substituted acrylic acids and the esters, nitriles, amids, chlorides and anhydrides of said acids and a polymerized ester of acrylic acid.

WALTER BAUER.